(12) United States Patent
Zimmermann

(10) Patent No.: US 9,806,309 B2
(45) Date of Patent: Oct. 31, 2017

(54) APPARATUS AND METHOD FOR INCREASING THE SAFETY DURING THE USE OF BATTERY SYSTEMS

(71) Applicant: Robert Bosch GmbH, Stuttgart (DE)

(72) Inventor: Ulrich Zimmermann, Hessigheim (DE)

(73) Assignee: Robert Bosch GmbH, Stuttgart (DE)

( * ) Notice: Subject to any disclaimer, the term of this patent is extended or adjusted under 35 U.S.C. 154(b) by 533 days.

(21) Appl. No.: 14/322,293

(22) Filed: Jul. 2, 2014

(65) Prior Publication Data

US 2015/0007893 A1     Jan. 8, 2015

(30) Foreign Application Priority Data

Jul. 2, 2013   (DE) .................. 10 2013 212 836

(51) Int. Cl.
*H01M 2/12*        (2006.01)
(52) U.S. Cl.
CPC ..... *H01M 2/1223* (2013.01); *Y10T 137/0379* (2015.04)

(58) Field of Classification Search
None
See application file for complete search history.

(56) References Cited

U.S. PATENT DOCUMENTS

| 2012/0070703 A1 | 3/2012 | Wahl et al. |
| 2013/0059175 A1* | 3/2013 | Engel ................. H01M 2/12 |
| | | 429/50 |

FOREIGN PATENT DOCUMENTS

| JP | 2009205991 | 9/2009 |
| JP | 2010118339 | 5/2010 |
| JP | 2010118339 A * | 5/2010 |

* cited by examiner

*Primary Examiner* — Daniel Gatewood
(74) *Attorney, Agent, or Firm* — Michael Best & Friedrich LLP

(57) ABSTRACT

A battery system, in particular a lithium-ion battery system, comprising a discharge line (AL) with an opening for discharging substances which are produced in the battery system, in particular gases, to the surroundings of the battery system.

10 Claims, 1 Drawing Sheet

APPARATUS AND METHOD FOR INCREASING THE SAFETY DURING THE USE OF BATTERY SYSTEMS

The present invention relates to an apparatus and a method for increasing the safety during the use of battery systems.

Battery systems are known from the prior art, said battery systems comprising a discharge line with an opening for discharging substances which are produced in the battery system, in particular gases, to the surroundings of the battery system.

For instance, DE102009000660A1 discloses a battery module with at least one device for outputting gases which are produced in the battery module. Furthermore, JP2010118339A has disclosed a device for outputting gases which are produced in a battery module.

SUMMARY OF THE INVENTION

The invention proceeds from a battery system, in particular a lithium-ion battery system, there being a discharge line with an opening for discharging substances which are produced in the battery system, in particular gases, to the surroundings of the battery system.

The core of the invention consists in that, at one end of the discharge line, from which end substances are discharged to the surroundings of the battery system, a closure which can be opened uni-directionally and is self-closing in the opposite direction to the opening direction, by means of a closing component which is attached to a boundary between an interior of the discharge line and an exterior of the discharge line, opens and automatically closes at the boundary from the interior of the discharge line to the exterior of the discharge line, and a component of the battery system, by way of which component a force is generated which leads to the closure closing automatically, is arranged in the interior of the discharge line.

The factor of attaching the closure, which can be opened uni-directionally and is self-closing in the opposite direction to the opening direction, at the boundary between the interior of the discharge line and the exterior of the discharge line leads to the advantage of protecting the discharge line against undesired blocking, since the interior of the discharge line is closed in a completely sealed manner at the boundary to the exterior of the discharge line. Undesired blocking can occur as a result of the penetration or introduction of objects into the discharge line. As a result of a blockage of the discharge line by way of the objects, the discharge of substances which are produced in the battery system can be impeded or interrupted; both lead to an increase in the risk when dealing with battery systems.

In addition, according to the invention, a method is provided for increasing the safety when dealing with discharge lines of battery systems, in particular lithium-ion battery systems, suitable for the controlled degassing of battery systems, wherein a closure which can be opened uni-directionally and closed, by means of a closing component which is attached at a boundary between an interior of the discharge line and an exterior of the discharge line, opens and closes automatically at the boundary from the interior of the discharge line to the exterior of the discharge line, wherein the closure which can be opened uni-directionally and is self-closing is opened when a threshold value of the pressure which prevails in the discharge line is reached or exceeded, and the force which leads to the closure closing automatically is generated by means of a component of the battery system, which component lies in the interior of the discharge line. The factor of the closure which can be opened uni-directionally and is self-closing in the opposite direction to the opening direction opening only when a threshold value of the pressure which prevails in the discharge line is reached or exceeded leads to the advantage that opening of the closure can be carried out depending on the technical and physical properties of the battery system.

According to a further preferable embodiment of the invention, a holding apparatus of the closure is attached in the interior of the discharge line or at the boundary from the interior of the discharge line to the exterior of the discharge line.

According to a further advantageous embodiment of the invention, the closure is a plunger, in particular a plunger with an annular sealing lip.

The use of a plunger with an annular sealing lip leads to the advantageous factor of protecting the discharge line against gases which penetrate from the outside or against other substances. Furthermore, the plunger which is attached in the interior of the discharge line can be reached and influenced from the exterior only in a complicated manner.

According to a further preferable embodiment of the invention, the closure is a non-return valve. The use of non-return valves leads to the advantage that gases which are produced in the battery system are discharged within a short time period, since non-return valves open virtually without delay.

According to a next preferable embodiment of the invention, the threshold value, at which the closure which can be opened uni-directionally opens when said threshold value is reached or exceeded, depends on the charge storage capacity of the battery system. In particular, said threshold value lies at 5 bar. The physical and technical properties of the battery system are the background of the dependence of the threshold value on the charge storage capacity: the battery system which can contain, for example, at least one battery cell exhibits a distribution of the substances to be discharged in the discharge line and a pressure drop in the discharge line which depends on the charge storage capacity of the battery system or the at least one battery cell. The charge storage capacity of the battery system or of the at least one battery cell leads to a requirement-dependent opening characteristic of the closure.

BRIEF DESCRIPTION OF THE DRAWINGS

In the following text, the invention will be explained using exemplary embodiments, from which further inventive features can result, but to which the scope of the invention is not restricted. The exemplary embodiments are shown in the drawings, in which.

DETAILED DESCRIPTION

Figure 1:
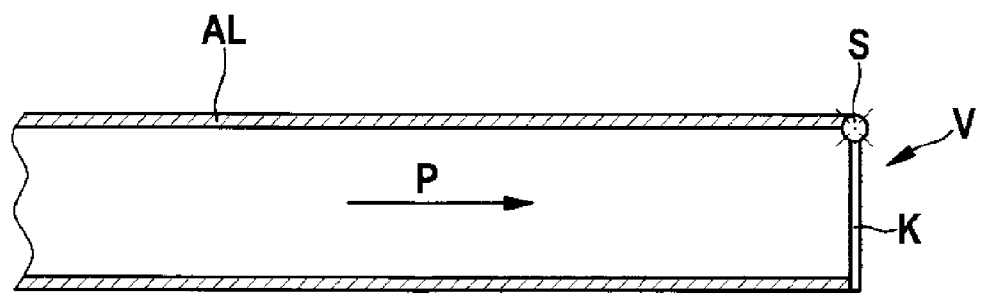
FIG. 1 shows a diagrammatic illustration of the discharge line of the battery system according to the invention with a closure which can be opened uni-directionally and is self-closing in the opposite direction to the opening direction, the closure being configured according to the invention as a non-return valve.

FIG. 1 diagrammatically shows a discharge line AL with a closure V which can be opened uni-directionally and is self-closing in the opposite direction to the opening direction, the closure V being configured as a non-return valve according to one embodiment of the invention. The discharge line AL serves to discharge substances which are produced in a battery system (not shown), in particular gases, to the surroundings of the battery system.

An arrow P indicates a flow direction of the substance which is discharged from the battery system. S denotes a hinge which connects the discharge line AL to a flap K which closes the discharge line AL in a sealed manner. The flap K opens and closes automatically at a boundary between an interior of the discharge line AL and an exterior of the discharge line AL.

The flap K can be moved only in one direction for the purpose of opening the discharge line AL; the opening of the flap K is caused by the pressure of the flowing substance. The flap K is pulled back into a starting position again by means of a pulling apparatus (not shown), for example a spring, the spring being an elastically restoring apparatus. The starting position is reached when the flap K closes the discharge line AL in a sealed manner again.

The pulling apparatus can be configured, for example, in one structural unit with the hinge S. The pulling apparatus (not shown) is attached in the interior of the discharge line AL.

In particular, the closure V opens when a threshold value of the pressure which prevails in the discharge line AL is reached or exceeded. The pressure which prevails in the discharge line AL depends, for example, on the charge storage capacity of the battery system or at least one battery cell which the battery system can contain, in particular.

Furthermore, a higher charge state of the battery system or the at least one battery cell is associated with a higher pressure and/or a higher temperature of the substances to be discharged. For example, the threshold value could be adapted to the charge state of the battery system or the at least one battery cell.

The closure V can be designed mechanically to open automatically when the pressure which prevails in the interior of the discharge line AL reaches or exceeds the threshold value, or it can be opened by means of an actuator system (not shown). A pressure sensor (not shown) can be used, in particular, to measure the pressure. The signals which are generated by way of the pressure sensor can be processed by an evaluation unit (not shown) and can be used finally to open the closure by means of the actuator system depending on the generated signals. The shape of the flap K is adapted to the inner profile of the discharge line AL and can have, for example, an elliptical, in particular a circular, or a polygonal, in particular a rectangular, preferably a square, shape.

Figure 2:
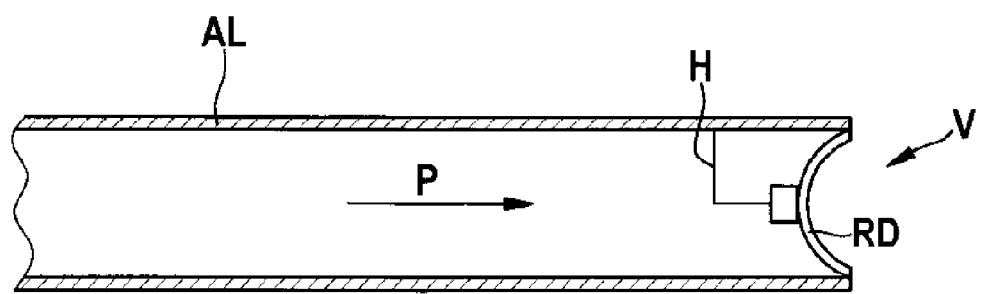
FIG. 2 shows a diagrammatic illustration of the discharge line of the battery system according to the invention with a closure which can be opened uni-directionally and is self-closing in the opposite direction to the opening direction, the closure being configured according to the invention as a plunger with an annular sealing lip.

FIG. 2 diagrammatically shows a discharge line AL with a closure V which can be opened uni-directionally and is self-closing in the opposite direction to the opening direction, the closure V being configured as a plunger with an annular sealing lip RD according to one embodiment of the invention. The discharge line AL serves to discharge substances which are produced in a battery system (not shown), in particular gases, to the surroundings of the battery system.

An arrow P indicates a flow direction of the substance which is discharged from the battery system. H denotes a holder which connects the discharge line AL to an annular sealing lip RD which closes the discharge line AL in a sealed manner. The annular sealing lip RD opens and closes automatically at a boundary between an interior of the discharge line AL and an exterior of the discharge line AL.

The annular sealing lip RD can be moved only in one direction for the purpose of opening the discharge line AL; the opening of the annular sealing lip RD is caused by the pressure of the flowing substance. As soon as the pressure of the flowing substance reaches or undershoots a defined value, the annular sealing lip assumes its original shape again. The original shape is reached when the annular sealing lip RD closes the discharge line AL in a sealed manner again.

The holder H is attached in the interior of the discharge line AL.

In particular, the closure V opens when the pressure which prevails in the discharge line AL reaches or exceeds a threshold value. The pressure which prevails in the discharge line AL depends, for example, on the charge storage capacity of the battery system or at least one battery cell which the battery system can contain, in particular.

Furthermore, a higher charge state of the battery system or the least one battery cell is associated with a higher pressure and/or a higher temperature of the substances to be discharged. For example, the threshold value could be adapted to the charge state of the battery system or the at least one battery cell.

The closure V can be designed mechanically to open automatically when the pressure which prevails in the interior of the discharge line AL reaches or exceeds the threshold value, or it can be opened by means of an actuator system (not shown). A pressure sensor (not shown) can be used, in particular, to measure the pressure. The signals which are generated by way of the pressure sensor can be processed by an evaluation unit (not shown) and can be used finally to open the closure by means of the actuator system depending on the generated signals.

What is claimed is:

1. A lithium-ion battery system comprising:
   a discharge line (AL) including an end with an opening for discharging substances produced in the battery system to the surroundings of the battery system, wherein the end is at a boundary between an interior of the discharge line (AL) and the exterior of the battery system; and
   a closure (V) including a closing component (K, RD) attached at the end of the discharge line (AL) and, when in a closed position, closes the opening of the discharge line (AL) in a sealed manner, and
   wherein the closing component (K, RD) opens uni-directionally and is biased toward the closed position by an element of the closure (V) arranged in the interior of the discharge line (AL).

2. The lithium-ion battery system according to claim 1, characterized in that a holding apparatus (S, H) of the closure (V) is attached in the interior of the discharge line (AL) or at the end of the discharge line (AL).

3. The lithium-ion battery system according to claim 1, characterized in that the closing component (RD) is a plunger, which has an annular sealing lip (RD).

4. The lithium-ion battery system according to claim 1, wherein the closure (V) includes a holding apparatus (H) that is attached in the interior of the discharge line (AL) and that is attached to the plunger.

5. The lithium-ion battery system according to claim 1, characterized in that the closure (V) is a non-return valve.

6. The lithium-ion battery system according to claim 1, wherein the closing component (RD) is cup-shaped and has an annular sealing lip (RD).

7. The lithium-ion battery system according to claim 6 wherein the closure (V) includes a holding apparatus (H) that is attached in the interior of the discharge line (AL) and that is attached to the plunger.

8. The lithium-ion battery system according to claim 1, wherein the closing component (K) is a flap (K) having a hinge (S) at the end of the discharge line (AL).

9. A method for increasing the safety when dealing with discharge lines (AL) of lithium-ion battery systems, suitable for the controlled degassing of battery systems, the method comprising:

providing a discharge line (AL) having an end with an opening, wherein the end is at a boundary between an interior of the discharge line (AL) and exterior of the battery system;

providing a closure (V) having a closing component (K, RD) attached at the end of the discharge line (AL) and, when in a closed position, the closing component (K, RD) closes the opening of the discharge line (AL) in a sealed manner, and wherein the closing component (K, RD) opens uni-directionally;

discharging substances produced in the battery system to the surroundings of the battery system by opening the closing component (K, RD) when a threshold value of the pressure which prevails in the discharge line (AL) is reached or exceeded; and sealing the opening of the discharge line (AL) with the closing component (K, RD) in response to a biasing force generated by an element of the closure (V) arranged in the interior of the discharge line (AL).

10. The method according to claim 9, characterized in that the threshold value depends on the charge storage capacity of the battery system, and lies at 5 bar.

\* \* \* \* \*